Oct. 23, 1951 — F. G. KELLY — 2,572,626
DYNAMOMETER SYSTEM
Filed Oct. 23, 1947 — 2 SHEETS—SHEET 1

Inventor
Frederick G. Kelly
Henry Lanahan
Attorney

Oct. 23, 1951  F. G. KELLY  2,572,626
DYNAMOMETER SYSTEM
Filed Oct. 23, 1947  2 SHEETS—SHEET 2
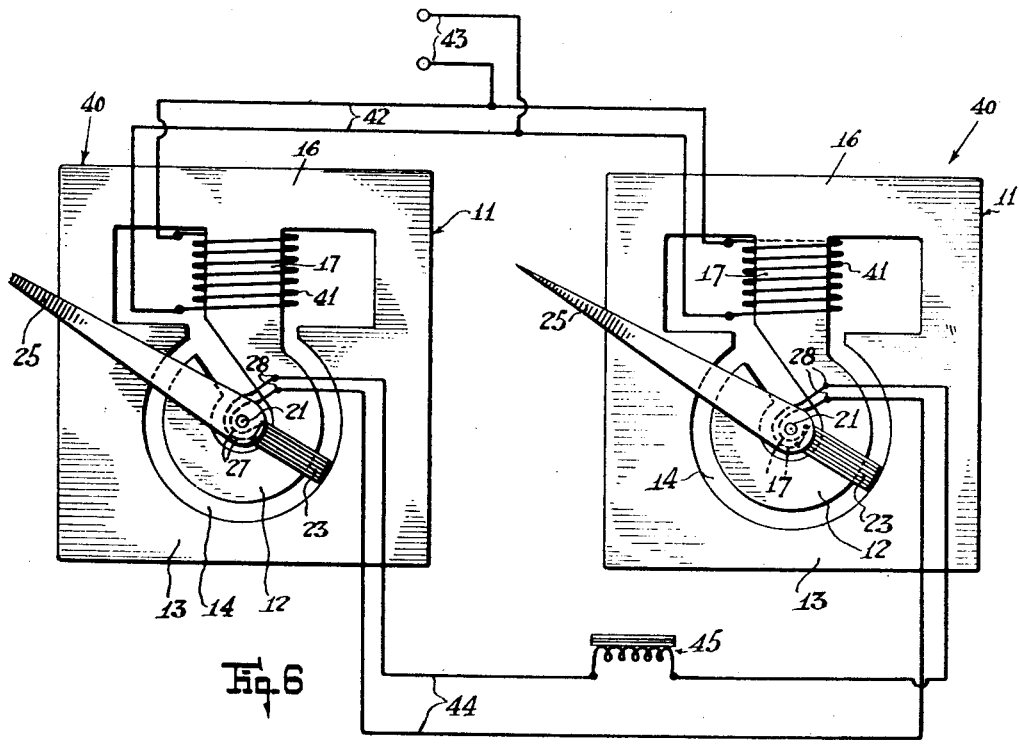
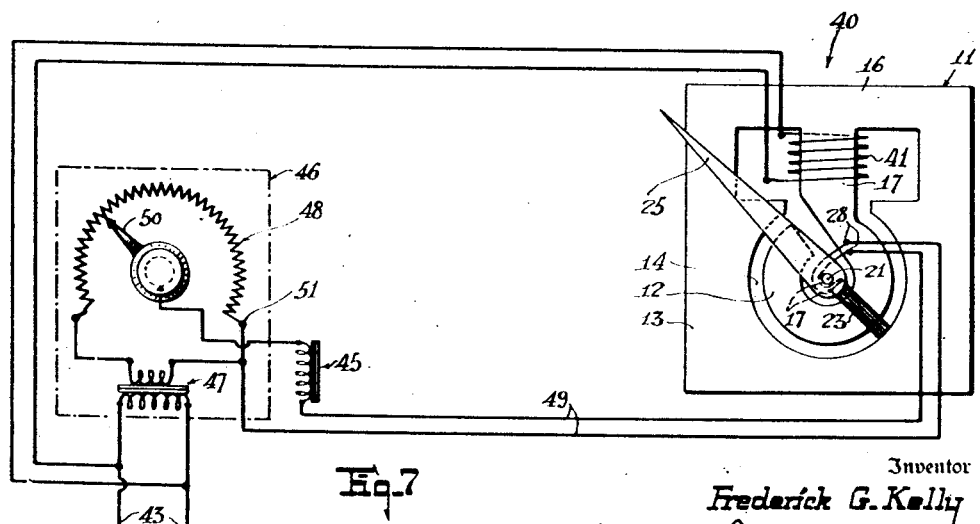
Inventor
Frederick G. Kelly
By Henry Lanahan
Attorney Patented Oct. 23, 1951

2,572,626

UNITED STATES PATENT OFFICE 2,572,626

DYNAMOMETER SYSTEM

Frederick G. Kelly, West Orange, N. J., assignor to Thomas A. Edison, Incorporated, West Orange, N. J., a corporation of New Jersey Application October 23, 1947, Serial No. 781,722

9 Claims. (Cl. 318—25)

This invention relates to indicating and/or measuring systems utilizing a dynamometer-type instrument and associated apparatus adapted to cause the instrument to work on the null-balance principle. More particularly, in one respect the invention relates to a novel A. C. indicator system utilizing circuits and apparatus in conjunction with a dynamometer-type instrument to enable the measurement of different quantities, particularly electrical impedance—resistive, inductive or capacitive—and conditions representable in terms thereof, without error due to variations in the voltage and frequency of the A. C. supply for the system. In another respect, the invention relates to an A. C. dynamometer-type position indicator, known otherwise as a telemeter, which works on a null-balance principle.

An object of the invention is to provide a novel A. C. dynamometer system for measuring impedance and other quantities, which is independent in its operation of wide variations in the alternating current supply.

Another object is to provide a novel form of A. C. telemetering system which is also independent in its operation of wide variations in the alternating current supply.

Other objects and features of my invention will be apparent from the following description and the appended claims.

In the description of my invention reference is had to the accompanying drawings, of which:

Figures 6 and 7 are views showing novel telemetering systems according to my invention.

Figure 1:
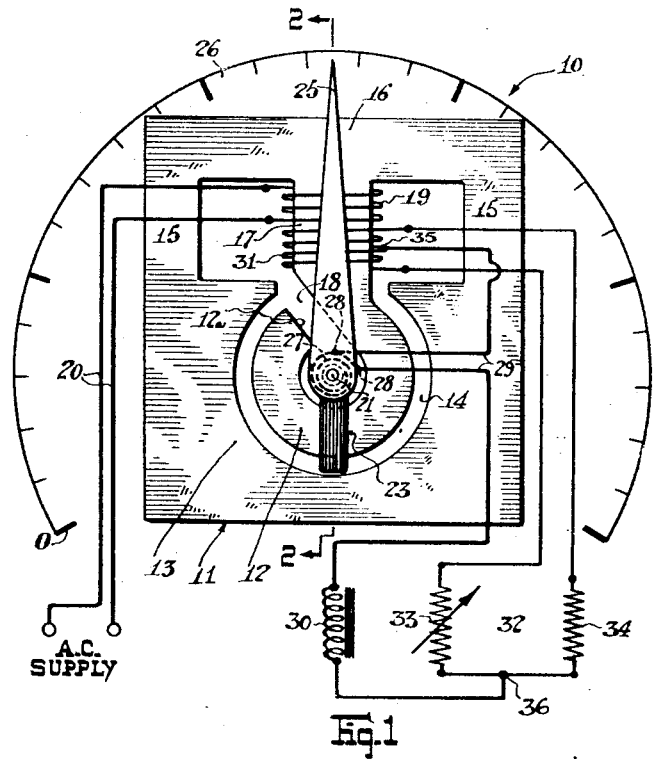
Figure 1 is a plan view of a dynamometer-type indicator and of associated circuits and apparatus according to a preferred embodiment of my invention, the associated circuits and apparatus being diagrammatically shown.
Figure 2:
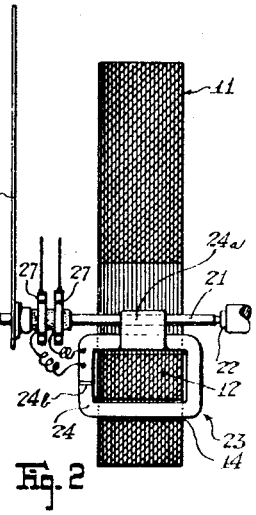
Figure 2 is a sectional view of the dynamometer instrument taken substantially on the line 2—2 of Figure 1.
Figure 3:
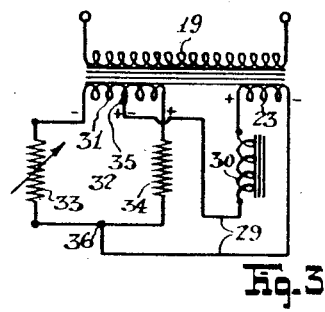
Figure 3 is a diagrammatic view showing the electrical circuits of my dynamometer system.

The indicating and/or measuring system shown in Figures 1 through 3 employs a dynamometer-type indicator which may be of any suitable standard form. By way of preferred illustration, I show such an indicator 10 which is of the long-scale variety. This indicator comprises a closed field structure 11 made of non-permanent magnetic material, preferably laminated, which has an inner annular pole piece 12 surrounded by an outer pole piece 13 to provide an annular air gap 14 therebetween. This gap has a uniform width and has an annular length of about 270°. The outer pole piece has two extending legs 15 joined at their outer ends by a transverse member 16, and the inner annular pole piece has a leg 17 extending from one end thereof and joined to the central portion of the transverse member 16. The free end 12a of the annular pole piece is spaced from the other end thereof by an air gap 18. It is by way of this gap that the armature is mounted as will hereinafter appear.

Surrounding the leg 17 is a primary coil 19 which is connected by leads 20 to a suitable source of alternating current marked "A. C. Supply," which may for example be a 110-volt line. The alternating flux $\phi$ set up by the current in this primary coil flows into the annular pole piece 12, through the annular air gap into the pole piece 13 and thence back through the legs 15 and cross member 16 to the central leg 17. Since the air gap 14 has uniform width the flux therein is substantially equally distributed—i. e., of uniform density.

At the center of the annular pole piece there is a spindle 21 pivoted at its ends in jewel bearings 22 (Figure 2). Surrounding the annular pole piece, at a clearance distance therefrom, is an armature coil 23. This coil may for example be wound on a light metal frame 24 which has an air gap 24b so that it will not act as a shorted secondary turn to the A. C. flux through it. On this frame there is an extending lug 24a joined to the spindle 21 as indicated in Figure 2. Carried also by this spindle is a pointer 25 which registers with a scale 26.

The leads of the armature coil are secured to the inner ends of two spiral instrument springs 27, these inner ends of the springs being secured insulatedly to the spindle 21 as in any suitable manner known in the art. The outer ends of these springs are anchored to respective terminals 28 (Figure 1) which serve as stationary terminals for the moving armature coil. The instrument springs are made very light so that they have little or no torque influence on the pivoted armature coil.

Figure 4:
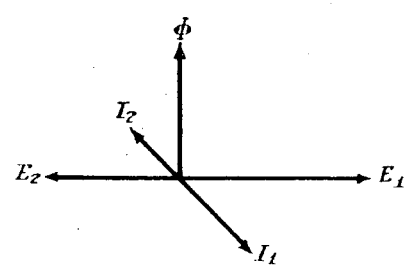
Figure 4 is a vector diagram showing the phase relation between the field flux, voltage and current quantities occurring in the present dynamometer system.

The armature coil 23 is connected in a closed circuit 29 which includes, among other elements hereinafter described, an inductance coil 30. This inductance coil gives the circuit an inductive reactance and causes the current to lag the voltage in this circuit. One voltage component in this circuit is that which is induced in the armature coil, this component being herein referred to as $E_1$. When the current $I_1$, which flows as a result of the voltage $E_1$, has a component which is either in phase with or in phase opposition to that voltage, this current will react with the field flux in the air gap to exert a torque $T_1$ on the armature coil. For example, the voltage $E_1$ induced in the armature coil will lag the field flux $\phi$ by 90° as shown in Figure 4. The current $I_1$ resulting from the induced voltage $E_1$ will in turn be at a lagging phase angle with respect to that induced voltage and will have an effective component therefore in phase opposition to the flux $\phi$ as also shown in Figure 4. When the effective component of the current $I_1$ is in phase opposition to the air gap flux the resultant torque $T_1$ is in a direction tending to move the armature coil to positions whereat the inductive coupling with the primary coil is less—which is in a clockwise direction towards the free end of the arcuate pole piece 12 in the present embodiment. This torque $T_1$ constitutes one driving component for the armature of the instrument.

Figure 5:
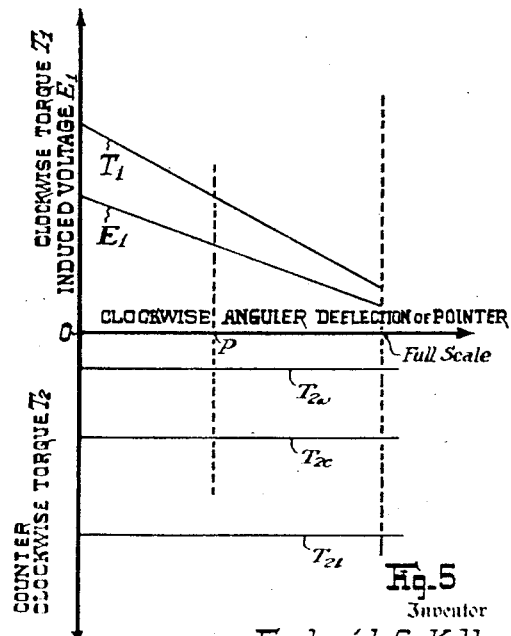
Figure 5 is a graph showing certain voltage and torque relations to armature deflection which occur in the present system.

In Figure 5 there is a graph showing variation of the induced voltage $E_1$ with armature deflection. This voltage is produced as a result of the linkage of the field flux in the arcuate pole piece with the armature coil. Since this linkage decreases substantially linearly as the pointer is deflected clockwise from zero to full-scale positions, the voltage $E_1$ decreases linearly as shown. Similarly, the current $I_1$ will decrease linearly. The counterclockwise torque $T_1$ is proportional to the product of the current $I_1$ and the flux density in the air gap. Since the flux density is constant throughout the length of the air gap, the torque $T_1$ will also decrease linearly as shown.

In the armature circuit 29 there is provided a second voltage $E_2$ which is in phase opposition to the induced voltage $E_1$ to produce a current $I_2$ which opposes the current $I_1$ (Figure 4) and tends to propel the armature coil in a counterclockwise direction. In the application of my invention for measuring impedance and conditions representable in the terms of impedance, this bucking voltage $E_2$ is obtained from the A. C. supply for the dynamometer system so that it will not vary in relation to the voltage $E_1$ in response to changes in the voltage and frequency of the A. C. supply. The relative values of the voltages $E_2$ and $E_1$ are however varied according to the variations in the condition under measurement, preferably by varying the voltage $E_2$. The voltage $E_2$ is obtained for example from a winding 31 provided on the leg 17 of the field structure, this being a secondary winding in relation to the primary winding 19, and the variation between the voltages $E_2$ and $E_1$ according to the condition under measurement is obtained from a voltage divider or potentiometer 32 connected across the winding 31. The potentiometer may comprise, for example, two resistors 33 and 34 connected serially across the winding 31 of which one resistor 33 is variable. By way of illustration, the variable resistor 33 may be one that is responsive to temperature, say the active element of a resistor bulb, in which case the dynamometer system will measure in terms of temperature. The voltage $E_2$ is varied through a range equal to the range of variation of the induced voltage $E_1$. Since the voltage $E_1$ is typically of small magnitude, and it is desired that the voltage $E_2$ be highly sensitive to changes in the variable resistor 33, this voltage $E_2$ is derived between a tap 35 of the winding 31—preferably a center tap of that winding—and the junction 36 between the resistors 33 and 34.

The voltages generated by the two sections of the winding 31 are respectively in phase with and in phase opposition to the induced voltage $E_1$, the instantaneous phasing of these voltages relative to the induced voltage $E_1$ being for example indicated in Figure 3. Since the voltage $E_2$ is to be in phase opposition to the voltage $E_1$, it will be understood that in the illustrated embodiment the variable resistor 31 has to be always less than the resistor 34 since it is in the branch of the divider network including the section of the winding 31 wherein the voltage is in phase opposition to the voltage $E_1$; conversely, if the variable resistor 33 were in the other branch of the divider network it would always have to be greater than the resistor 34. The resistors 33 and 34 are however not arbitrarily interchangeable. When the variable resistor 33 is in the branch including the out-of-phase section of the winding 31, as shown, the resultant bucking voltage $E_2$ decreases with increasing values of the resistor 33. If the resistors 33 and 34 are interchanged the voltage $E_2$ increases with increasing values of the resistor 33. Thus, the scale 26 is reversed if the resistors 33 and 34 are interchanged. Also, interchanging the resistors 33 and 34 will affect the scale distribution because successive increments of the voltage $E_2$, caused by successive incremental changes in the resistor 33, vary differently when that resistor has values less than the fixed resistor 34 that when it has values greater than that resistor. For example, if the variable resistor 33 is in the branch including the in-phase section of the winding 31 and increases above the value at which the potentials of the junctions 35 and 36 are in balance, the resultant scale of the instrument tends to be contracted at the upper, or full-scale, portion thereof. On the other hand, when the variable resistor is in the branch including the out-of-phase section of the winding 31 and increases towards the value at which the potentials of the junctions 35 and 36 are in balance, the resultant scale of the instrument tends to be much less contracted through the upper portion thereof. In fact, for this latter condition the non-linearity of the voltage network 31—32 substantially counteracts the non-linearity in the temperature-resistance characteristic of the usual resistor bulb to give a scale, in terms of temperature, which is substantially linear.

The counterclockwise torque component $T_2$, which is produced when any given value of voltage $E_2$ is induced in the armature circuit, is constant throughout the range of deflection of the armature coil. This is because the torque $T_2$ is proportional to the product of the current $I_2$ and the flux density in the air gap, and both of these quantities are constant for any given voltage of the A. C. supply. Thus, when the voltage $E_2$ is at minimum and maximum values the torque $T_2$ will be shown in Figure 5 by the respective lines $T_{2a}$ and $T_{2b}$. For intermediate values of the voltage $E_2$, the torque $T_2$ will vary between these extreme values, as illustrated for example by the torque line $T_{2c}$.

The operation of the present dynamometer system is as follows: First it is to be noted that the voltage $E_2$ is established by the variable resistor 33 at a value within the range of variation of the induced voltage $E_1$. Thus at one position of the armature coil the two voltages $E_1$ and $E_2$ are equal, the resultant currents $I_1$ and $I_2$ balance out one another and the resultant torque on the armature coil is zero. This may be termed a position of equilibrium of the armature coil. For example, if the voltage $E_2$ is such as to give a torque $T_2$ equal to the line $T_{2c}$ (Figure 5) this equilibrium position on the scale is at P. If the armature is deflected from this equilibrium position in a counterclockwise direction—i. e., to move the pointer towards zero of the scale—the clockwise torque $T_1$ is increased over that of the counterclockwise torque $T_2$ to cause the armature coil to be propelled back to its equilibrium position. On the other hand, if the armature coil is deflected clockwise from this equilibrium position, the counterclockwise torque $T_2$ becomes the greater and the armature coil is again propelled back to its equilibrium position. Thus the equilibrium position is a stable one at which the armature coil tends always to remain. When the variable resistor 33 changes to set the voltage $E_2$ at a different value, the armature coil will seek a new position whereat the voltages $E_1$ and $E_2$ are again equal. Thus by proper calibration of the scale 26 the pointer will indicate correctly the value of the resistor 33 or of any condition representable in terms thereof such as temperature, as has been hereinbefore noted. These indications of the instrument will however be substantially uninfluenced by changes in the frequency and voltage of the A. C. supply since such changes influence the voltages $E_1$ and $E_2$ alike.

It may be here noted that the tendency to reverse the scale caused by interchanging the resistors 33 and 34, as hereinbefore explained, can itself be counteracted by reversing the direction of the arcuate pole piece 12. In the illustrated embodiment, the variable resistor is less than the resistor 34 to cause the voltage $E_2$ to decrease with increasing values of the resistor 33, and the arcuate pole piece 12 extends clockwise to cause the induced voltage $E_1$ to decrease with clockwise rotation of the pointer, wherefore the pointer advances clockwise in response to increasing values of the resistor 33. If the variable resistor increases above the value of the resistor 34, and the arcuate pole 12 extends counterclockwise, the voltage $E_2$ will increase with increasing values of the resistor 33 and the induced voltage $E_1$ will increase with clockwise rotation of the pointer to cause the scale to have the same direction.

If the effective reactance of the armature circuit were capacitive instead of inductive, the currents $I_1$ and $I_2$ would lead the respective voltages $E_1$ and $E_2$, the respective torques $T_1$ and $T_2$ would be reversed and each equilibrium position of the armature coil would be an unstable one—i. e., one whereat a slight deflection of the armature coil in either direction would set up a torque unbalance tending to deflect the armature farther away from equilibrium position. However, the effective reactance of the armature circuit may be made inductive without adding any separate inductances, for example, by using a voltage divider composed of inductances in place of the resistors 33 and 34, it being understood that the inductances are to be relatively variable according to variations in the condition under measurement.

As a further modification, the voltage divider may be composed of capacitances in place of the resistors 33 and 34, which are relatively variable as aforementioned, and the inductance 30 may be so chosen as to still fulfil the required condition that at the frequency of operation the effective reactance of the armature circuit shall be inductive.

In Figure 6 there is shown an A. C. position-indicating system, or telemeter, according to my invention, which works also on the null-balance principle. By way of illustrative example, I show both the driving and following units of this telemetering system as comprising long-scale dynamometer instruments 40 each of which is the same in its mechanical construction as is the indicator 10 hereinbefore particularly described. For instance such instrument 40 has a closed field structure 11 with poles 12 and 13, an annular air gap 14, an armature coil 23 carried by the spindle 21, stationary terminals 28 connected by respective spiral instrument springs 27 to the armature coil, and a pointer 25 carried by the spindle 21, all the same as in the instrument 10. Also, each of the instruments 40 has a primary winding 41 on the central leg 17 of the field structure 11, corresponding to the primary coil 19 of the instrument 10; however, the instruments 40 do not have secondary windings as has the foregoing instrument.

The primary windings 41 are connected in parallel by a circuit 42 to a power supply line 43. This power supply line is to be connected to any suitable source of alternating current, say a 110-volt line. The armature coils 23 are connected serially in phase opposition in a closed circuit 44 which serially includes an inductance 45. These are the only electrical circuits of the telemetering system.

Either one of the dynamometer instruments 40 may be the driving unit and the other the following or remote-position indicating unit, but for purposes of description the driving and following units are considered as being the left- and righthand instruments respectively as they appear in Figure 6. The operation of this system will be readily understood to be basically the same as is that of the foregoing embodiment. For instance, because of the inductance 45 in the armature circuit, each armature coil tends to swing towards the free end of the arcuate pole 12 in response to the voltage $E_1$ induced in the armature coil by reason of its inductive coupling with the primary coil 41 of the respective instrument. Assume that the armature of the driving instrument is in the position shown and that the voltage induced in this coil by the respective primary winding 41 is $E_2$. The voltage $E_1$ induced in the armature coil of the following instrument will be equal and opposite to the voltage $E_2$ when the armature of the following instrument is in a position corresponding to that of the driving instrument. These are equilibrium positions of the armatures of the two instruments whereat the resultant torque on the respective armature coils is zero. If, for example, the armature of the driving instrument is turned clockwise to a new position, the voltage $E_2$ will be less than the induced voltage $E_1$ and, as a result, the armature of the following instrument will be propelled clockwise towards the free end of the arcuate pole into a new position corresponding to the position of the armature of the driving instrument. On the other hand, if the armature of the driving instrument is turned counterclockwise to a new position the voltage $E_2$ will be greater than the voltage $E_1$ and the armature of the following instrument will be propelled counterclockwise away from the free end of the arcuate pole into a new position corresponding to that of the driving instrument. Thus, the armature of the following instrument tends always to seek a position corresponding to that of the driven instrument.

It will be understood that the driving instrument provides a source of alternating current which is varied according to the position of the armature of that instrument. When the armature of the driving instrument is moved mechanically from one position to another, there is a reaction force exerted thereon tending to return it to the position from which it was moved until the armature of the following instrument reaches a corresponding position. However, the armature of the following instrument will follow that of the driving instrument almost instantaneously and as soon as it reaches a position corresponding to that of the driving instrument, both it and that of the driving instrument are at rest—i. e., no resultant torque is exerted thereon. Thus, the two armatures act as though they were interlocked, and will remain at rest unless one or the other is displaced by some mechanical force.

In Figure 7 there is shown a modified position-indicating system according to my invention wherein the same following instrument is used as is shown in Figure 6; however, a driving unit 46 is here used comprising a step-down transformer 47 having its primary winding connected to the A. C. supply line 43 and its secondary winding connected to a potentiometer 48. A circuit 49 of the armature coil 23 of the following instrument 40 serially includes the inductance 45 and is connected from the movable contact 50 of the potentiometer to a terminal 51 of the potentiometer. This terminal is so chosen that clockwise movement of the movable contact will produce a decreasing A. C. voltage in the armature circuit; also, the phasing of the transformer 47 is so chosen that the voltage which is so impressed on the armature circuit will be in phase opposition to the voltage induced in the armature coil 23. From the foregoing description, it will be apparent that the armature of the following instrument 40 will always seek a position whereat the voltage induced therein is equal and opposite to that impressed on the armature circuit by the potentiometer. If the potentiometer has a uniform voltage characteristic, the instrument 40 will give accurately a remote indication of the angular positioning of the movable contact of the potentiometer.

From the foregoing description it is apparent that a feature of my invention lies in providing a bucking voltage in the armature circuit of the dynamometer instrument, which is opposed to that induced in the moving armature coil and which is made variable according to a quantity or a condition under measurement; also, this voltage is made dependent on the voltage and frequency of the A. C. supply for the dynamometer system. I have herein described several ways of obtaining that variable bucking voltage, but it will be understood that I intend no unnecessary limitation thereto. For instance, the variation in the bucking voltage may otherwise be effected, as in the embodiment of Figure 1, by varying the inductive coupling between the winding 31 and the associated primary winding 19. Such and other changes may be made without departure from the scope of my invention, which I endeavor to express according to the following claims.

I claim:

1. In a dynamometer-type indicator system including a source of alternating current: the combination of a stationary primary coil connected across said source; a single moving coil in the field of said primary coil and having a varying inductive coupling with said primary coil as the former is moved; a closed circuit for said moving coil without conductive connection with said primary coil and comprising a reactive impedance distinct from that of said moving coil, said circuit having therein a first A. C. current resulting from the voltage induced in said moving coil, said reactive impedance being adapted to cause said current to be at a phase angle to said voltage whereby said current reacts efficiently with the flux of said primary coil to subject the moving coil to an actuating torque; and means operatively connected to said circuit to produce therein a variable second A. C. current the ratio of which to said first current is independent of the frequency of said source and which is at least partially in phase opposition to said first current.

2. In a dynamometer-type indicator system including a source of alternating current: the combination of a stationary primary coil connected across said source; a single moving coil in the field of said primary coil and having a varying inductive coupling with said primary coil as the former is moved; a closed circuit for said moving coil without conductive connection with said primary coil and comprising a reactive impedance distinct from that of said moving coil, said circuit having therein a first A. C. current resulting from the voltage induced in said moving coil, said reactive impedance being adapted to cause said current to be at a phase angle to said voltage whereby said current reacts efficiently with the flux of said primary coil to subject the moving coil to an actuating torque; means inductively coupling said circuit to said source to provide a second A. C. current therein which is at least partially in phase opposition to said first current; and variable impedance means in said circuit distinct from that of said moving coil for varying said current relative to each other.

3. In a dynamometer-type indicator system including a source of alternating current: the combination of a stationary primary coil connected to said source; a single moving coil in the field of said primary coil and having a varying inductive coupling with said primary coil as the former is moved, a closed circuit including said moving coil and an inductive reactance distinct from that of said moving coil, said inductive reactance being adapted to cause the current in said circuit resulting from the voltage induced in said moving coil to lag said voltage whereby said current reacts efficiently with the flux of said primary coil to subject the moving coil to an actuating torque; an inductive coupling between said source and said circuit to produce in the latter an A. C. voltage substantially 180° out of phase with the A. C. voltage induced in said moving coil; and a variable voltage divider in said circuit for varying said opposing voltages relative to each other.

4. In a dynamometer-type indicator system including a source of alternating current: the combination of a stationary primary coil connected to said source; a moving coil in the field of said primary coil and having a varying inductive coupling with said primary coil as the former is moved, a transformer secondary winding coupled to said source and provided with an intermediate tap; a pair of impedance elements connected serially across said secondary winding, one of said elements being variable in relation to the other; and a circuit connecting said moving coil from said intermediate tap to the junction between said impedance elements, said circuit being characterized as having a lagging phase characteristic, and said secondary winding and impedance elements being so arranged that the voltage impressed on said circuit is substantially 180° out of phase with the voltage induced in said moving coil.

5. In a dynamometer-type indicator system including a source of alternating current: the combination of a stationary primary coil connected to said source; a moving coil in the field of said primary coil and having a varying inductive coupling with said primary coil as the former is moved; a winding inductively coupled to said primary winding and having an intermediate tap; a pair of resistance elements serially connected across said winding, one of said elements being variable relative to the other; and a circuit connecting said moving coil between said intermediate tap and the junction between said resistance elements, said circuit serially including an inductance to cause the current in said circuit resulting from the voltage induced in said moving coil to lag said induced voltage, and said resistance elements having such relative values that the voltage appearing between said junction and said tap is substantially 180° out of phase with said induced voltage.

6. A long-scale dynamometer system of a null-balance type comprising a field structure including a pair of poles having an arcuate air gap therebetween and portions joining said poles to form a magnetic circuit completed by way of said air gap, one of said poles being arcuate and being joined at one end only to said other pole; a primary coil on said portions for producing a flux across said air gap; an armature coil pivoted at the center of said arcuate pole and embracing said arcuate pole to have a decreasing inductive coupling with said primary coil, causing the voltage induced therein to decrease through a given range, as the armature coil is moved towards the free end of the arcuate pole; a closed circuit for said armature coil, said circuit having therein an inductive reactance tending to cause said coil to be propelled towards the free end of said arcuate pole in response to the reaction between said flux and the current resulting from said induced voltage; means providing a bucking voltage in said circuit substantially 180° out of phase with said induced voltage and tending to propel said moving coil away from the free end of said arcuate pole; and means for varying said bucking voltage throughout said range of variation of the voltage induced in said moving coil.

7. A long-scale dynamometer system of a null-balance type comprising a field structure including a pair of poles having an arcuate air gap therebetween and portions joining said poles to form a magnetic circuit completed by way of said air gap, one of said poles being arcuate and being joined at one end only to said other pole; a primary coil on said portions for producing a flux across said air gap; an armature coil pivoted at the center of said arcuate pole and embracing said arcuate pole to have a decreasing inductive coupling with said primary coil, causing the voltage induced therein to decrease through a given range, as the armature coil is moved towards the free end of the arcuate pole; a closed circuit for said armature coil, said circuit having therein an inductive reactance tending to cause said coil to be propelled towards the free end of said arcuate pole in response to the reaction between said flux and the current resulting from said induced voltage; means providing a bucking voltage in said circuit substantially 180° out of phase with said induced voltage and tending to propel said moving coil away from the free end of said arcuate pole; and a voltage divider included in said circuit for effectively varying said bucking voltage throughout the range of the voltage induced in said armature coil.

8. A long-scale dynamometer system of a null-balance type comprising a field structure including a pair of poles having an arcuate air gap therebetween and portions joining said poles to form a magnetic circuit completed by way of said air gap, one of said poles being arcuate and being joined at one end only to said other pole; a primary coil on said portions for producing a flux across said arm gap; an armature coil pivoted at the center of said arcuate pole and embracing said arcuate pole to have a decreasing inductive coupling with said primary coil, causing the voltage induced therein to decrease through a given range, as the armature coil is moved towards the free end of the arcuate pole; a winding energized by said source and having an intermediate tap; a voltage divider connected across said winding; a circuit connecting said moving coil from said tap to said divider, said circuit and divider being arranged so that the A. C. current produced by the resultant voltage in the circuit is in lagging relation to that voltage, and said divider being adapted to cause the effective voltage provided in said circuit by said winding to be substantially in phase opposition to the voltage induced in said armature coil.

9. In a dynamometer-type position-indicator system including a source of alternating current: the combination of a driving unit comprising a potentiometer connected to said source and including a movable contact; a dynamometer-type following instrument including a primary coil connected to said source and a movable armature coil in the field of said primary coil and having a varying inductive coupling with said primary coil as the armature coil is moved; a circuit including said armature coil and connected from said movable contact to one terminal of said potentiometer such that the voltage provided in the circuit by said potentiometer is substantially in phase opposition to the voltage induced in said armature coil; and an inductance serially included in said armature circuit.

FREDERICK G. KELLY.

REFERENCES CITED

The following references are of record in the file of this patent:

UNITED STATES PATENTS

| Number | Name | Date |
|---|---|---|
| 416,006 | Moennich | Nov. 26, 1889 |
| 1,953,435 | Satinoff et al. | Apr. 3, 1934 |
| 1,964,230 | Tanner | June 26, 1934 |
| 1,973,279 | Bernarde | Sept. 11, 1934 |
| 2,408,218 | Lenehan et al. | Sept. 24, 1946 |

FOREIGN PATENTS

| Number | Country | Date |
|---|---|---|
| 14,969 of 1901 | Great Britain | Jan. 9, 1902 |
| 693,274 | France | Nov. 18, 1930 |